United States Patent
King et al.

(10) Patent No.: US 9,013,168 B2
(45) Date of Patent: Apr. 21, 2015

(54) SYSTEM FOR TRANSFERRING ENERGY FROM AN ENERGY SOURCE AND METHOD OF MAKING SAME

(75) Inventors: Robert Dean King, Schenectady, NY (US); Ruediger Soeren Kusch, Clifton Park, NY (US); Meng Zhu, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 363 days.

(21) Appl. No.: 13/490,505

(22) Filed: Jun. 7, 2012

(65) Prior Publication Data

US 2013/0328539 A1 Dec. 12, 2013

(51) Int. Cl.
*G05F 5/00* (2006.01)
*H02J 1/10* (2006.01)

(52) U.S. Cl.
CPC ............ *H02J 1/102* (2013.01); *Y10T 29/49117* (2015.01)

(58) Field of Classification Search
CPC ...................................................... H02J 1/102
USPC .......... 323/299, 300; 363/131, 132; 180/65.1, 180/65.21, 65.23, 65.24, 65.265, 65.31; 307/9.1, 48, 56, 58, 86
See application file for complete search history.

(56) References Cited

U.S. PATENT DOCUMENTS

| | | | |
|---|---|---|---|
| 7,595,597 B2 | 9/2009 | King et al. | |
| 7,821,225 B2 * | 10/2010 | Chou et al. | 320/103 |
| 7,866,425 B2 | 1/2011 | King et al. | |
| 2003/0222502 A1 * | 12/2003 | Takahashi et al. | 307/18 |
| 2007/0296357 A1 | 12/2007 | Song et al. | |
| 2008/0148993 A1 | 6/2008 | Mack | |
| 2008/0197796 A1 | 8/2008 | Bae et al. | |
| 2009/0103341 A1 | 4/2009 | Lee et al. | |
| 2011/0100735 A1 | 5/2011 | Flett | |
| 2011/0195618 A1 | 8/2011 | Arbuckle et al. | |
| 2012/0038216 A1 | 2/2012 | Berry et al. | |
| 2012/0187887 A1 * | 7/2012 | Sone | 318/504 |
| 2013/0169039 A1 * | 7/2013 | Zhu et al. | 307/10.1 |

OTHER PUBLICATIONS

Marchesoni et al., "New DC-DC Converter for Energy Storage System Interfacing in Fuel Cell Hybrid Electric Vehicles", IEEE Transactions on Power Electronics, Jan. 2007, pp. 301-308.

* cited by examiner

*Primary Examiner* — Matthew Nguyen
(74) *Attorney, Agent, or Firm* — Ziolkowski Patent Solutions Group, SC; Jean K. Testa

(57) ABSTRACT

A system for transferring energy from an energy source includes a first energy source, a DC link coupled to a DC load, a first DC-to-DC voltage converter coupled to the DC link, and a second DC-to-DC voltage converter coupled to the first energy source. A controller is coupled to the first and second DC-to-DC voltage converters and configured to determine a voltage level of the first energy source and of the DC link. If the voltage level of the DC link is less than the voltage level of the first energy source, the controller controls the second DC-to-DC voltage converter to draw energy from the first energy source to cause the DC voltage output from the first energy source and supplied to the first DC-to-DC voltage converter to be below the DC load voltage supplied to the DC link via the first DC-to-DC voltage converter.

21 Claims, 5 Drawing Sheets

US 9,013,168 B2

SYSTEM FOR TRANSFERRING ENERGY FROM AN ENERGY SOURCE AND METHOD OF MAKING SAME

BACKGROUND OF THE INVENTION

Embodiments of the invention relate generally to electric drive systems including hybrid and electric vehicles and to stationary drives that are subject to transient or pulsed loads and, more particularly, to transferring energy between an electrical storage device or electrical energy source of the vehicle or drive to a load.

Hybrid electric vehicles may combine an internal combustion engine or a fuel cell and an electric motor powered by an energy storage device, such as a traction battery, to propel the vehicle. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

Purely electric vehicles use stored electrical energy to power an electric motor, which propels the vehicle and may also operate auxiliary drives. Purely electric vehicles may use one or more sources of stored electrical energy. For example, a first source of stored electrical energy may be used to provide longer-lasting energy while a second source of stored electrical energy may be used to provide higher-power energy for, for example, acceleration.

Energy may be transferred from the energy source of a vehicle or drive to a DC link coupled to a DC load. Often, a bi-directional boost converter may be included to decouple the energy source from a direct connection with the DC link and to boost voltage from the energy source to a higher level voltage for supply to the DC link. A high voltage boost ratio between the low side of the bi-directional boost converter that receives the voltage of the energy source and the high side of the boost converter that supplies the boosted voltage to the DC link tends to decrease system efficiency.

Increasing the system efficiency by lowering the voltage boost ratio may include having an energy source capable of supplying a voltage at or above a value near the voltage desired on the DC link. However, an uncontrollable current event may occur when the voltage of the energy source is above the voltage desired on the DC link.

It would therefore be desirable to provide a system to facilitate the transfer of electrical energy from an electrical energy source to the DC link in a controlled manner when the voltage of the electrical energy source is higher than the actual or desired DC link voltage.

BRIEF DESCRIPTION OF THE INVENTION

According to an aspect of the invention, an apparatus includes a first energy source configured to output a DC voltage, a DC link coupled to a DC load and configured to supply a DC load voltage to the DC load based on the DC voltage from the first energy source, a first DC-to-DC voltage converter coupled to the DC link and configured to supply the DC load voltage to the DC link, and a second DC-to-DC voltage converter coupled to the first energy source. The apparatus also includes a controller coupled to the first and second DC-to-DC voltage converters and configured to determine a voltage level of the first energy source, to determine a voltage level of the DC link, and, if the voltage level of the DC link is less than the voltage level of the first energy source, to control the second DC-to-DC voltage converter to draw energy from the first energy source to cause the DC voltage output from the first energy source and supplied to the first DC-to-DC voltage converter to be below the DC load voltage supplied to the DC link via the first DC-to-DC voltage converter.

According to another aspect of the invention, a method of fabricating an energy transfer system including coupling a DC link to a DC load wherein the DC link configured to supply a DC load voltage to the DC load, coupling a first DC-to-DC voltage converter to the DC link wherein the first DC-to-DC voltage converter configured to supply the DC load voltage to the DC link, and coupling a second DC-to-DC voltage converter to a first energy source wherein the first energy source configured to output a DC voltage. The method also includes coupling a controller to the first and second DC-to-DC voltage converters and configuring the controller to compare a voltage level of the first energy source with a voltage level of the DC link, and if the voltage level of the first energy source is greater than the voltage level of the DC link, control the second DC-to-DC voltage converter to draw energy from the first energy source to cause the DC voltage output from the first energy source and supplied to the first DC-to-DC voltage converter to be below the voltage level of the DC link.

According to yet another aspect of the invention, a system includes a DC link, a load coupled to the DC link and configured to receive a load voltage therefrom, and a first energy source. The system also includes a first voltage measuring device coupled to the first energy source, a second voltage measuring device coupled to the DC link, a bi-directional energy source voltage converter configured to convert a first input voltage to a first converted voltage wherein the first input voltage supplied from the first energy source, and a bi-directional DC link voltage converter configured to convert a second input voltage to a second converted voltage and supply the second converted voltage to the DC link wherein the second converted voltage comprising the load voltage. The system also includes a controller configured to receive a voltage level of the first energy source from the first voltage measuring device, to receive a voltage level of the DC link from the second voltage measuring device, and to compare the voltage level of the first energy source with the voltage level of the DC link. The controller is also configured to control the bi-directional energy source voltage converter to draw energy from the first energy source to cause the second input voltage to be below the load voltage if the voltage level of the DC link is less than the voltage level of the first energy source, and control the bi-directional DC link voltage converter to convert the second input voltage to the second converted voltage and to supply the second converted voltage to the DC link.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
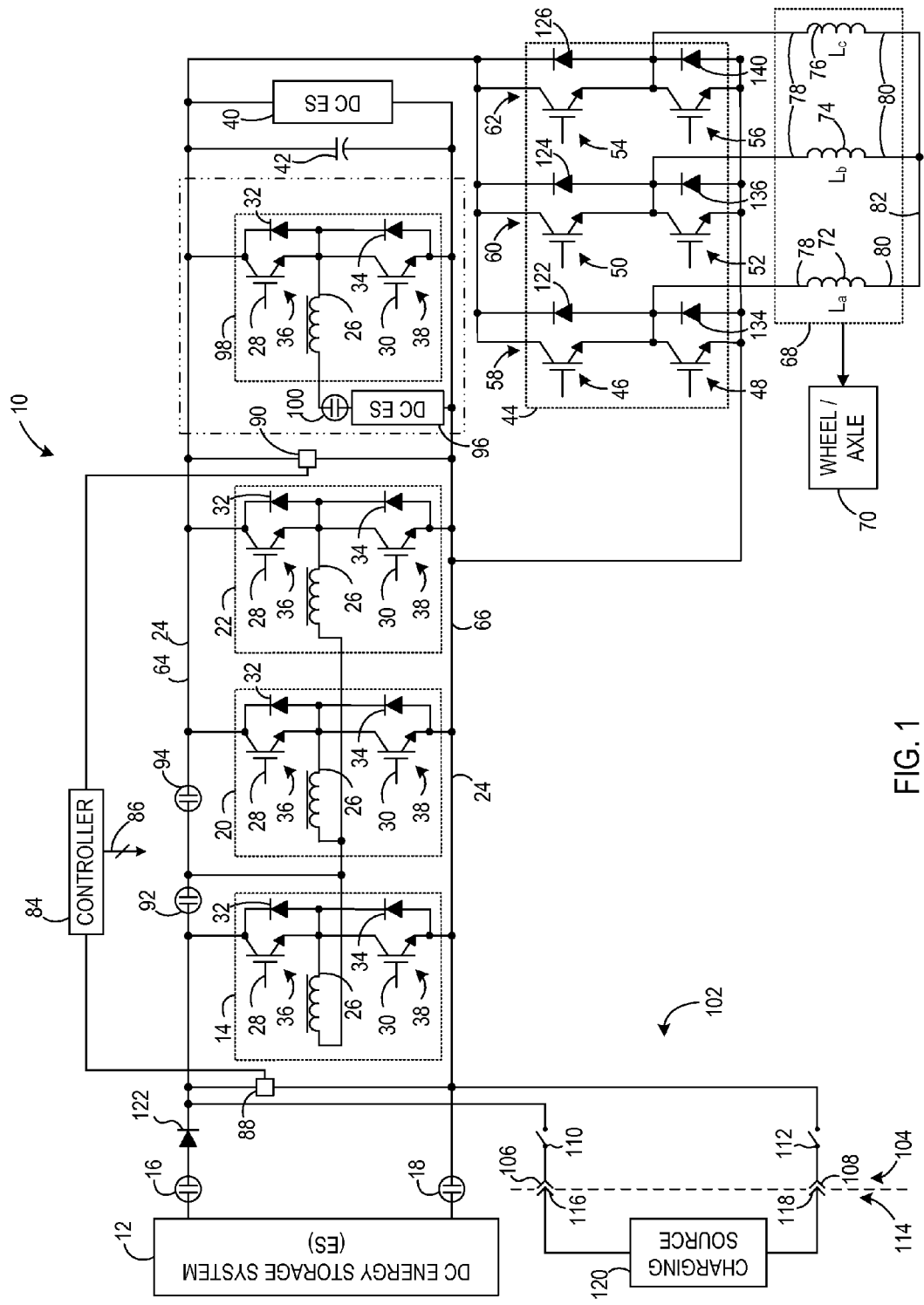
FIG. 1 is a schematic diagram of a traction system according to an embodiment of the invention.

FIG. 1 is a schematic diagram of a traction system 10 according to an embodiment of the invention. Traction system 10 includes a first DC energy source (ES) 12 coupleable to a bi-directional DC-to-DC voltage converter 14 via a pair of contactors or switches 16, 18. DC-to-DC voltage converter 14 is coupled to another pair of bi-directional DC-to-DC voltage converters, 20, 22 that are coupled to a DC link or bus 24. As used herein, an energy source refers to a device that stores electrical energy or that converts a non-electrical energy (e.g., chemical energy) into electrical energy. According to an embodiment of the invention, DC energy source 12 may be an energy storage unit as understood in the art such as a fuel cell, a sodium metal halide battery, a sodium nickel chloride battery, a sodium sulfur battery, a nickel metal hydride battery, a lithium ion battery, a lithium polymer battery, a nickel cadmium battery, a plurality of ultracapacitor cells, or a combination of ultracapacitors and batteries, as examples.

Each bi-directional DC-to-DC voltage converter 14, 20, 22 is configured to convert one DC voltage into another DC voltage and includes an inductor 26 coupled to a pair of switches 28, 30 and coupled to a pair of diodes 32, 34. Each switch 28, 30 is coupled to a respective diode 32, 34, and each switch/diode pair forms a respective half phase module 36, 38. Switches 28, 30 are shown, for illustrative purposes, as insulated gate bipolar transistors (IGBTs). However, embodiments of the invention are not limited to IGBTs. Any appropriate electronic switch can be used, such as, for example, metal oxide semiconductor field effect transistors (MOSFETs), bipolar junction transistors (BJTs), and metal oxide semiconductor controlled thyristors (MCTs).

A second ES 40 is coupled to DC link 24, and the nominal DC link voltage will be approximately equal to the nominal voltage of ES 40. In one embodiment, ES 40 is a high-voltage energy source and may be a battery, a flywheel system, fuel cell, an ultracapacitor, or the like. A DC link filter capacitor 42 coupled to DC link 24 provides a smoothing function for DC link 24 and filters high-frequency currents on DC link 24.

A bi-directional voltage modification assembly 44 is coupled to DC link 24. In one embodiment, bi-directional voltage modification assembly 44 is a bi-directional DC-to-AC voltage inverter. Bi-directional DC-to-AC voltage inverter 44 includes six half phase modules 46, 48, 50, 52, 54, and 56 that are paired to form three phases 58, 60, and 62. Each phase 58, 60, 62 is coupled to a pair of conductors 64, 66 of DC link 24. An electromechanical device or motor 68 is coupled to bi-directional DC-to-AC voltage inverter 44. In one embodiment, electromechanical device 68 is a traction motor mechanically coupled to one or more driving wheels or axles 70 of a vehicle (not shown) or other electrical apparatus including cranes, elevators, or lifts. Electromechanical device 68 includes a plurality of windings 72, 74, and 76 having a plurality of conductors 78 coupled to respective phases 58, 60, 62 of bi-directional DC-to-AC voltage inverter 44. Windings 72-76 also have a plurality of conductors 80 coupled together to form a common or neutral node 82. This electromechanical device winding connection is commonly referred to as a "wye"-connected electromechanical device. An alternate electrical winding connection configuration (not shown) is a "delta" connection where each respective phase is connected to two phase windings and does not contain a neutral node such as node 82.

Traction system 10 includes a controller 84 coupled to contactors 16-18, buck/boost converters 14 and 20-22, and half phase modules 46-56 via lines 86 to control operation of traction system 10 during motoring and charging modes as explained hereinbelow.

ES 40 may be configured to provide a higher power than ES 12 to provide power during, for example, acceleration periods of the vehicle. ES 12 may be configured to provide a higher energy than ES 40 to provide a longer-lasting power to the vehicle to increase a travelling distance thereof. According to an embodiment of the invention, ES 12 may be selected to approach a maximum output voltage at zero or relatively low output current levels that is approximately equal to or within a threshold higher voltage than the nominal voltage of ES 40, which is approximately equal to the nominal voltage of DC link 24. In this manner, the voltage boost ratio between the low voltage side of buck/boost converters 20-22 and the voltage of DC link 24 may help to achieve a high boost converter efficiency and overall system efficiency.

Controller 84 is coupled to an ES voltage sensor 88, which senses or measures a voltage of ES 12, and to a DC link voltage sensor 90, which senses or measures a voltage of DC link 24. During the motoring mode, controller 84 acquires the voltage measurements of ES 12 and DC link 24. Alternatively, controller 84 may receive voltage information of ES 12 via a communication link/interface (not shown) to an internal controller (not shown) within ES 12 to receive voltage readings prior to controller 84 closing contactors 16 and 18. The configuration shown in FIG. 1 allows voltage of ES 12 to be greater than the voltage on DC link 24. If the voltage of ES 12 is greater than the voltage on DC link 24 or is otherwise above a threshold level at which an uncontrolled current from ES 12 to DC link 24 would occur through voltage converters 20 or 22, controller 84 controls bi-directional DC-to-DC voltage converter 14 in a bucking mode to reduce the voltage supplied by ES 12 to a value below the threshold level. In one embodiment, the voltage is bucked to the voltage desired to be supplied to DC link 24. A contactor or switch 94 may be closed to supply the bucked voltage directly to DC link 24. In another embodiment, the voltage may be bucked such that when transferred to DC link 24, the voltage on DC link 24 has the desired level. In yet another embodiment, the bucked voltage may be boosted through one or both of voltage converters 20 or 22 for supply to DC link 24.

During operation of ES 12 at high current loads or at any time controller 84 determines that the voltage of ES 12 is below that of DC link 24, a contactor or switch 92 (if present) may be closed by controller 84 to supply the voltage from ES 12 directly to voltage converters 20, 22 while bypassing voltage converter 14 to reduce power loss due to the current from ES 12 passing through voltage converter 14. Since, in this case, the voltage of ES 12 is lower than the threshold level that would cause the uncontrolled current state from ES 12 to DC link 24 to occur, boosting the voltage from ES 12 to the DC link voltage remains in a controlled state.

Through appropriate control of half phase modules 46-56, controller 84 is configured to control bi-directional DC-to-AC voltage inverter 44 to convert a DC voltage or current on DC link 24 to an AC voltage or current for supply to windings 72-76 via conductors 78. Accordingly, the DC voltage or current from ES 40 may be transferred to DC link 24 and converted into an AC voltage or current and delivered to motor 68 to drive wheels 70. In other non-vehicle propulsion systems, the drive wheels 70 may be another type of load (not shown), including a pump, fan, winch, crane, or other motor driven loads. In a regenerative braking mode, electromechanical device 68 may be operated as a generator to brake wheels 70 or electromechanical devices (not shown) with overhauling loads and to supply AC voltage or current to bi-directional DC-to-AC voltage inverter 44 for inversion into a DC voltage or current onto DC link 24 that is suitable for recharging ES 40.

As shown in phantom, another ES 96 may be coupled to DC link 24 via a corresponding bi-directional DC-to-DC voltage converter 98. ES 96 may be used to provide additional power to DC link 24, to charge ES 40, or to raise the voltage level of DC link 24 to a level greater than that of ES 12. ES 96 may be, for example, a rechargeable battery or ultracapacitor capable of storing energy generated during a regenerative braking event. A contactor or switch 100 coupled to a positive terminal of ES 96 may be closed by controller 84 to begin transferring energy from ES 96 to DC link 24. It is contemplated that another contactor or switch (not shown) may also be coupled to the negative terminal of ES 96. While a single ES/voltage converter combination is illustrated in phantom, embodiments of the invention contemplate multiple ES/voltage converter combinations coupled to DC link 24. Alternatively, configurations are contemplated that use a single ES/voltage converter without a high specific power ES 40. In this case, the DC link 24 voltage would be set via controller 84 and associated ES 96 and DC-DC converter 98 or combinations of control of ES 12 and ES 96.

When a vehicle or apparatus incorporating traction system 10 is parked or not in use, it may be desirable to interface or plug the vehicle into, for example, an AC utility grid, DC supply, solar photovoltaic system, or other renewable energy source including a wind turbine, etc. to refresh or recharge ES 40 and any other rechargeable energy source such as ES 96. Accordingly, FIG. 1 shows an embodiment of the invention including a charging system 102 coupled to traction system 10 for the recharging of ES 40 such that components of traction system 10 may be used for the dual purposes of recharging ES 40 during the recharging mode and converting energy from ES 40 into energy usable to drive the load or propel the vehicle during the motoring mode.

Charging system 102 includes a plug 104 of traction system 10 having contacts 106, 108. Plug 104 is coupleable to voltage converter 14 via a pair of contactors or switches 110, 112 that allow energy from traction system 10 to be disconnected from plug 104 when no charging system 102 is attached thereto. A receptacle or plug 114 having contacts 116, 118 is configured to mate with plug 104. Plug 114 is coupled to a DC charging source 120. It is contemplated that interface to a utility grid charging source could be a conventional 480/208 V service transformer plus associated rectifier and filter components and possibly voltage regulation power electronic circuitry. Alternatively, the interface to the utility grid charging source could be a "medium voltage" for example 2.4 kV, 8 kV, 13.8 kV, or higher voltage that may combine the pole mount distribution transformer with the 480 V or 208 V secondary service transformer, thus further reducing the size, weight, and cost of transformer components while increasing efficiency of transmitting electric power from the grid for fast charging. A diode 122, or alternatively appropriate control of contactors 16 and 18, coupled between ES 12 and switch 110 may be used to prevent current from charging source 120 from being directly coupled to ES 12.

During the charging mode, switch 92 may be closed to allow energy from charging source 120 to be directly supplied to voltage converters 20, 22 for transferring or converting the charging source voltage to DC link 24 for recharging ES 40. If present, switch 100 and voltage converter 98 may be controlled to supply the charging voltage to ES 96. In addition, selected auxiliary loads including fans, power electronic pumps, etc. that are used to maintain temperature of traction system 10 within prescribed operating temperature range may be controlled by controller 84 during the recharge mode of operation.

During the charging mode when the charging source voltage is greater than the threshold voltage above maximum voltage of ES 40, switch 92 and 94 are opened, and the charge source 120 is bucked in DC-DC converter 14 and then boosted in DC-DC voltage converter 20 and 22 if present. During the charging mode when the charging source voltage is less than a second threshold voltage level below minimum voltage of ES 40, controller 84 closes contactor 92, and the charging source 120 voltage is boosted to desired value to charge ES 40. Likewise, for both of the above cases, ES 96 can be charged from charging source 120 by controller 84 providing control of DC-DC converter 98 in a bucking mode of operation.

Figure 2:
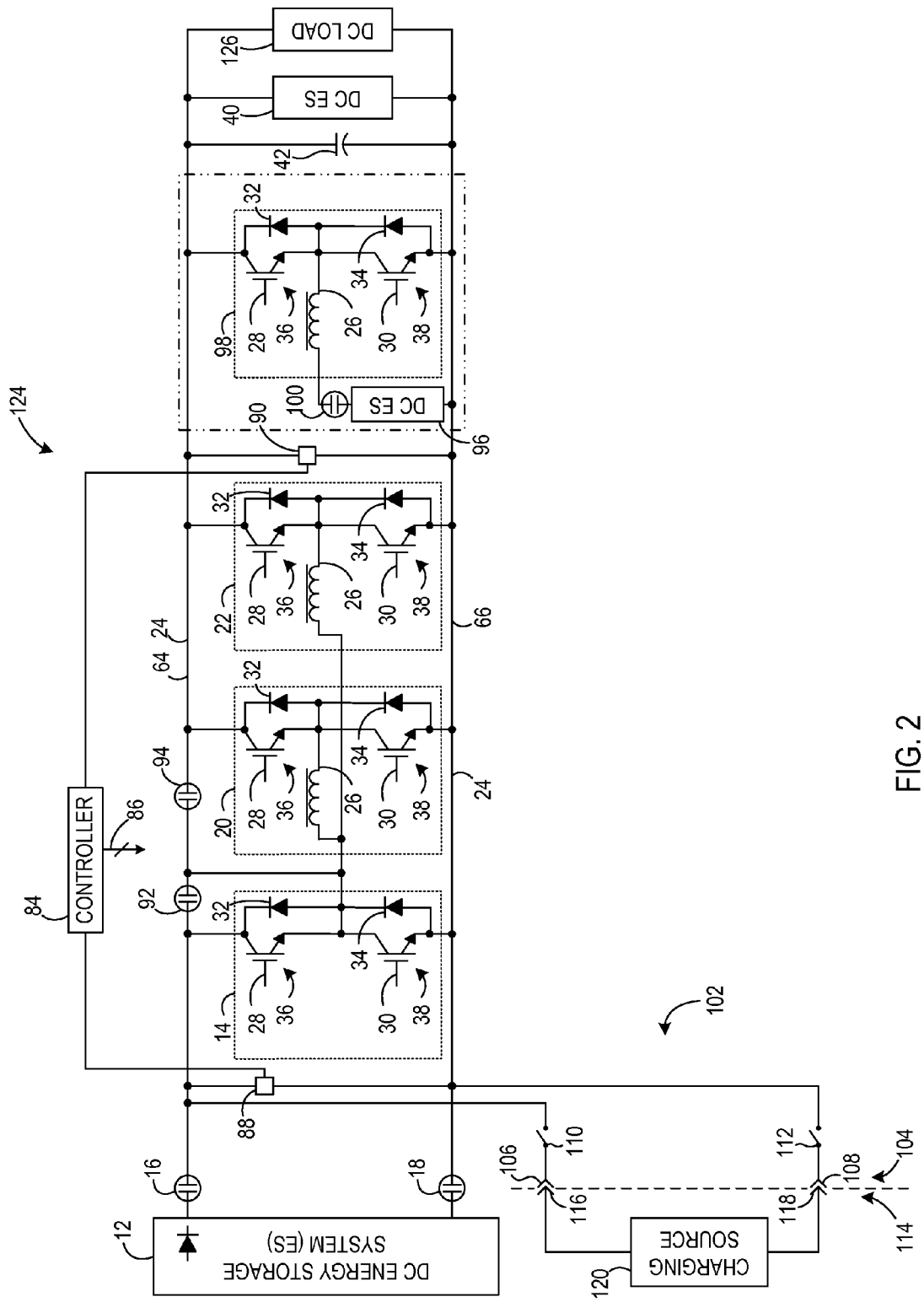
FIG. 2 is a schematic diagram of the traction system of FIG. 1 according to another embodiment of the invention.

FIG. 2 illustrates a schematic diagram of a traction system 124 according to another embodiment of the invention. Elements and components common to traction systems 10 and 124 will be discussed relative to the same reference numbers as appropriate. In the embodiment shown, bi-directional DC-to-DC voltage converter 14 includes half phase modules 36 and 38, but the inductor shown in FIG. 1 (e.g., inductor 26) has been eliminated therefrom for additional cost and weight savings.

Also, it is contemplated that ES 12 may be a DC energy source that incorporates its own diode or diode-equivalent functionality. Accordingly, diode 122 shown in FIG. 1 may be eliminated.

Furthermore, alternative to supplying energy to DC-AC inverter 44 and motor 68 as shown in FIG. 1, FIG. 2 also illustrates a DC load 126 that may be any type of DC load coupled to DC link 24 to receive energy therefrom or to supply energy thereto DC load 126 may be coupled to any of the traction systems described herein.

Figure 3:
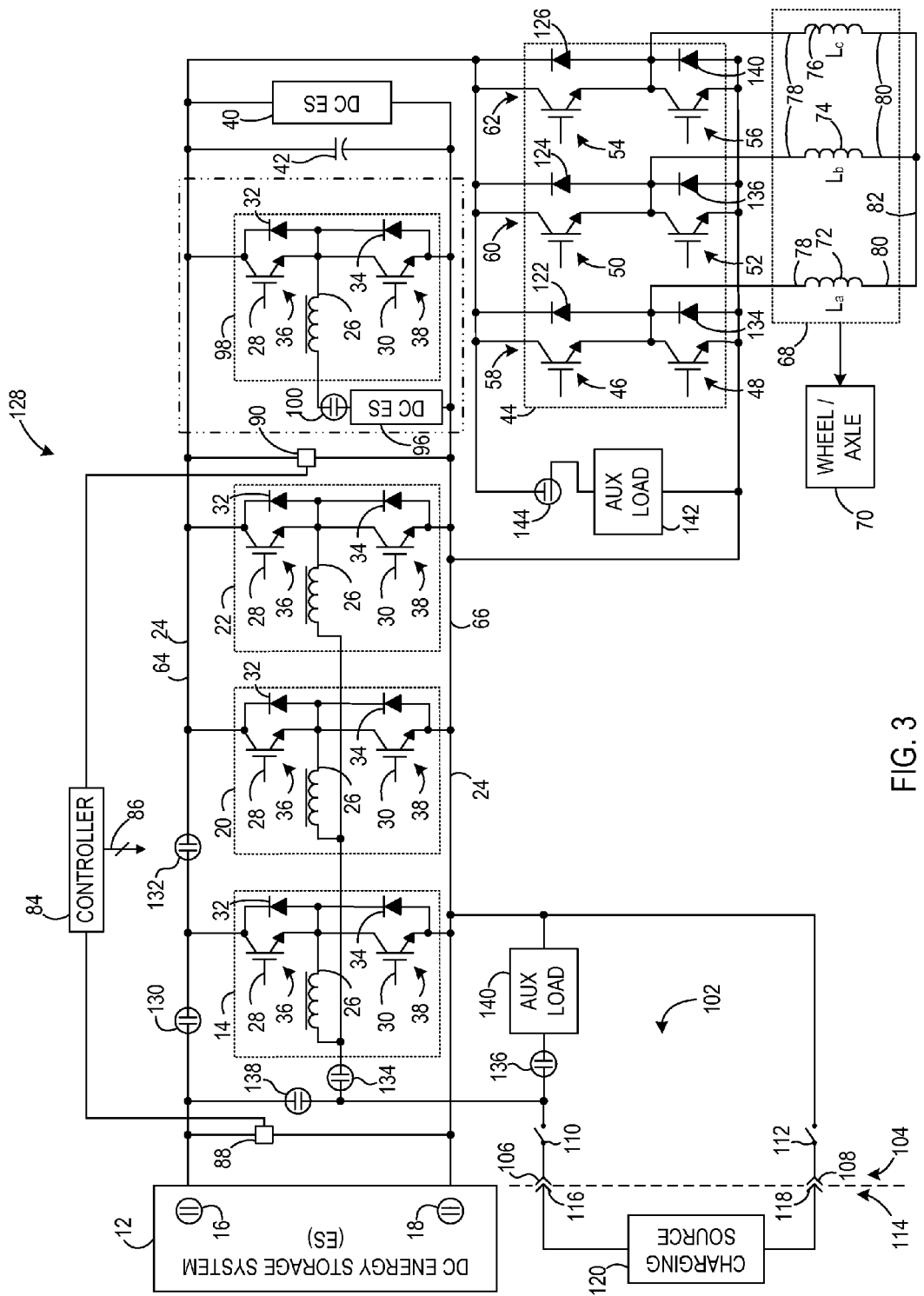
FIG. 3 is a schematic diagram of another traction system according to an embodiment of the invention.

FIG. 3 illustrates a schematic diagram of a traction system 128 according to another embodiment of the invention. Elements and components common to traction systems 10, 124, and 128 will be discussed relative to the same reference numbers as appropriate.

As shown in FIG. 3, a plurality of contactors or switches 130, 132, 134, 136, 138 are controlled by controller 84 during the motoring mode to avoid an uncontrolled operating mode of traction system 128. In one embodiment, if controller 84 determines that the voltage on DC link 24 is less than the output voltage of ES 12, controller 84 may control switches 130-138 and voltage converters 14 and 20-22 such that traction system 128 operates in a manner similar to that described above with respect to traction system 10. That is, controller 84 may control switches 132-138 to their off states and switch 130 to its on state such that the voltage from ES 12 may first be bucked via voltage converter 14 and then boosted via voltage converters 20, 22 for supply to DC link 24.

Once controller 84 determines that the voltage on DC link 24 is greater than the output voltage of ES 12 in this embodiment, switches 130 and 138 may be opened, switches 132 and 134 may be closed, and all or some of three voltage converters 14, 20-22 may be operated independently to boost the voltage from ES 12 to DC link 24. If desired, voltage converters 14, 20-22 may be operated according to an interleaved chopping scheme to reduce ripple current on ES 12.

In another embodiment, if controller 84 determines that the voltage on DC link 24 is less than the output voltage of ES 12, controller 84 may first cause switches 136, 138 to close such that voltage from ES 12 may be used to power one or more auxiliary loads 140 directly coupleable and related to ES 12 to lower the output of ES 12. If the supply of voltage from ES 12 to auxiliary load(s) 140 is sufficient to lower the voltage of ES 12 below the voltage of DC link 24, switches 132-134 may be controlled to their on states, and switch 130 may be maintained in its off state such that all or some of three voltage converters 14, 20-22 may be operated independently to boost the voltage from ES 12 to DC link 24. If desired, voltage converters 14, 20-22 may be operated in an interleaved chopping manner to reduce ripple current on ES 12.

One or more additional auxiliary loads 142 may be coupled to DC link 24 that may or may not be related to ES 12. For example, auxiliary loads 142 may be related to cabin comfort such as heaters and air conditioning units and may provide a plurality of electronic functions such as a radio, electronic dashboard controls, lighting, and motor controls for power seats and power windows, etc. Controller 84 may control the power supplied to auxiliary loads 142 from DC link 24 via a contactor or switch 144 respectively coupled thereto.

ES 12 in FIG. 3 may be a rechargeable energy source that may be recharged via charging system 102. In one embodiment, controller 84 may be programmed to close switches 16, 18, 110, 112, and 138 to allow charging energy from charging system 102 to be directly supplied to ES 12. In addition, switches 136 may be closed to supply power to any auxiliary loads 140 (fans, power electronic pumps, etc.) helpful for the regulation of ES 12 during its recharging cycle. In another embodiment, switch 138 may be opened and switches 16, 18, 110, 112, 130, and 134 may be closed to allow boosting control of the charging energy from charging system 102 via DC-DC converter 14.

Alternatively, if charging source 120 is a DC supply with proper voltage regulation, with handshaking control from controller 84, then ES 12 could be charged directly from off-board charger 120. Likewise, if charging source 120 has high power capability, the high specific power ES 40 could be rapid-charged with proper control of contactors shown in this configuration and controller 84 programmed to open switches 16 and 18. Also, ES 96 could be simultaneously charged using DC-DC converter 98 as a buck controller.

Figure 4:
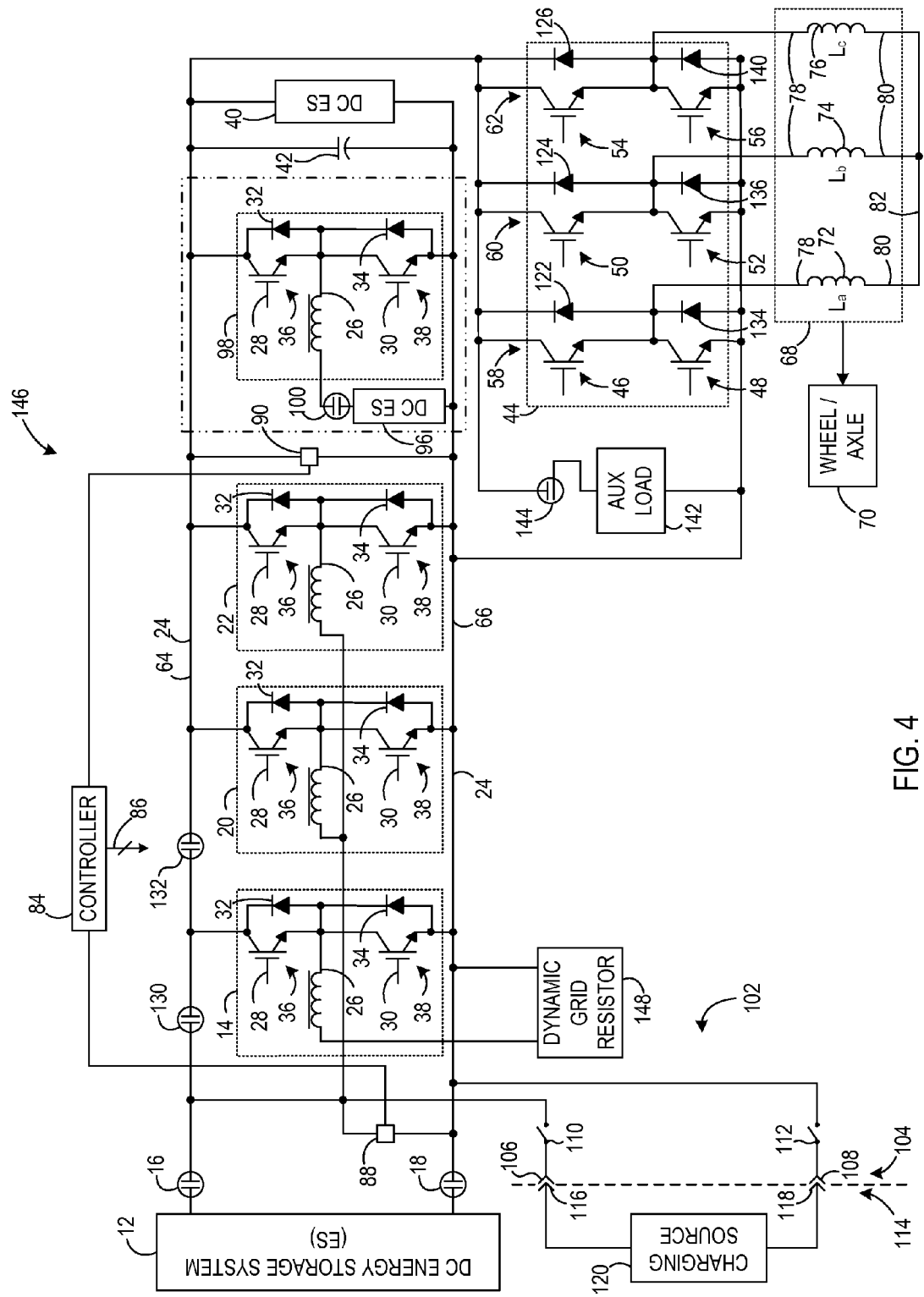
FIG. 4 is a schematic diagram of another traction system according to an embodiment of the invention.

FIG. 4 illustrates a schematic diagram of a traction system 146 according to another embodiment of the invention. Elements and components common to traction systems 10, 124, 128, and 146 will be discussed relative to the same reference numbers as appropriate.

As shown in FIG. 4, bi-directional DC-to-DC voltage converter 14 is coupled to buck energy from ES 12 and to supply the bucked voltage to a dynamic grid resistor bank 148 coupled to voltage converter 14. If, during the motoring mode, controller 84 determines that the voltage of ES 12 is greater than the voltage on DC link 24 or is otherwise above a threshold level at which an uncontrolled current from ES 12 to DC link 24 would occur through voltage converters 20 or 22, controller 84 may control switch 130 and DC-to-DC voltage converter 14 to cause voltage from ES 12 to flow through dynamic grid resistor bank 148 to reduce the voltage supplied by ES 12 to a value below the threshold level. During regenerative braking events, controller 84 may open switch 130, close switch 132, and control DC-to-DC voltage converter 14 to supply at least a portion of the regenerative energy to dynamic grid resistor bank 148 to control the voltage on DC link 24 during high levels of regenerative braking when used in vehicle or overhauling load applications. For example, when the voltage level of ES 12 is greater than the voltage level of DC link 24, excess voltage on DC link 24 may be directed to pass through dynamic grid resistor bank 148. In addition, dynamic grid resistor bank 148 can be used for self-test and diagnostics of components such as ES 12 and charging system 102, including testing connectors and cabling thereof or measuring power capability and quality of charging source 120.

Figure 5:
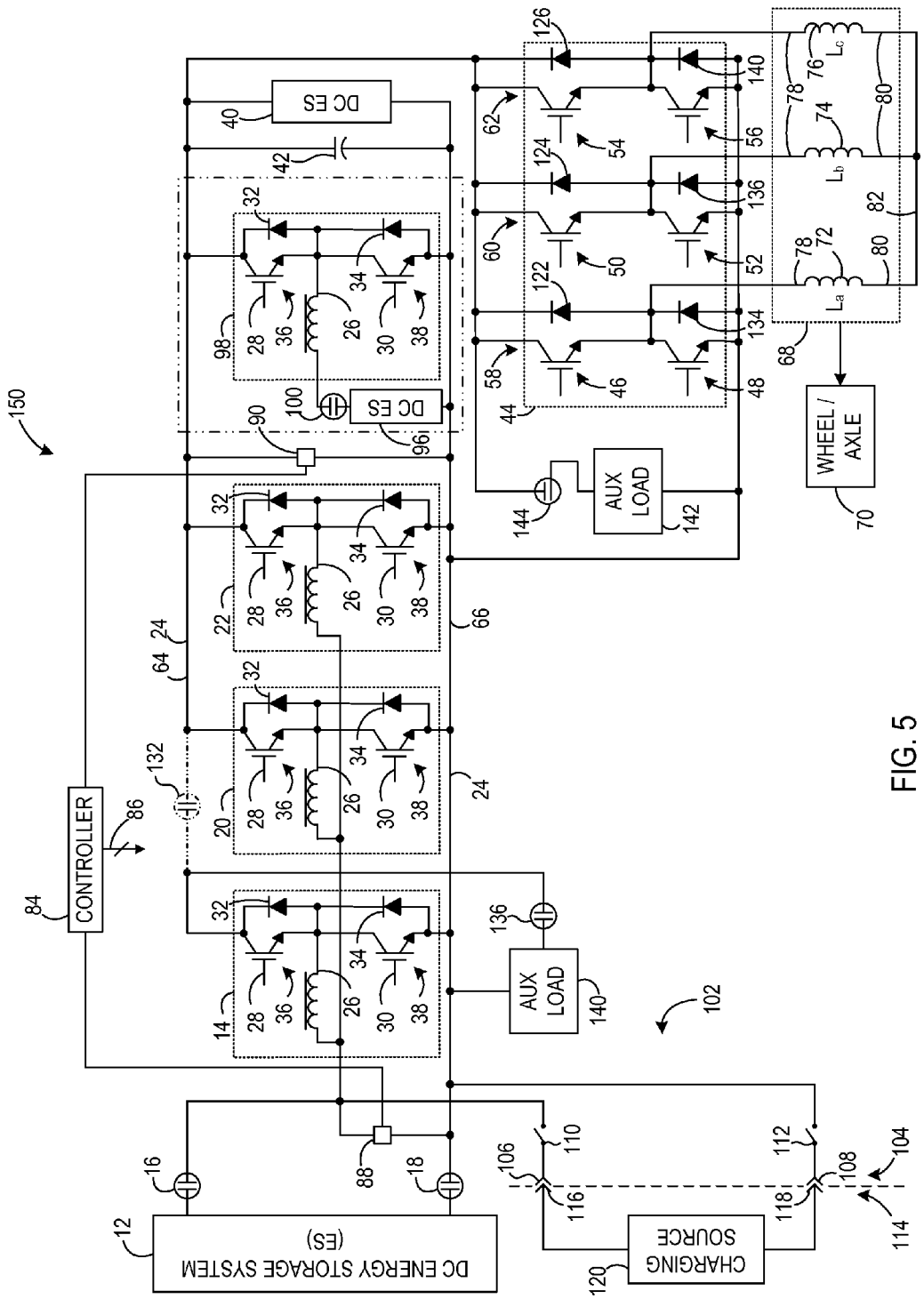
FIG. 5 is a schematic diagram of another traction system according to an embodiment of the invention.

FIG. 5 illustrates a schematic diagram of a traction system 150 according to another embodiment of the invention. Elements and components common to traction systems 10, 124, 128, 146, and 150 will be discussed relative to the same reference numbers as appropriate.

As shown in FIG. 5, bi-directional DC-to-DC voltage converter 14 is not coupled to buck energy from ES 12. Voltage converter 14 is, however, coupled to receive energy from ES 12 and to supply energy to auxiliary load(s) 140. In one embodiment, when the output voltage of ES 12 is sufficient to operate auxiliary load(s) 140, controller 84 may close switch 136 to cause the voltage from ES 12 to flow through diode 32 of converter 14 and to auxiliary load(s) 140. In this case, controller 84 need not actively control voltage converter 14. The voltage provided to auxiliary load(s) 140 will be the value of the voltage of ES 12 less a diode drop across diode 32.

In another embodiment, when the output voltage of ES 12 is not sufficient to operate auxiliary load(s) 140 such as during a high power level operation of traction system 150 and ES 12, controller 84 controller 84 may close switch 136 and control voltage converter 14 in a boost mode to increase the voltage supplied to auxiliary load(s) 140 to be within a desirable voltage range or at a voltage that is optimized to improve efficiency thereof.

Switch 132 (shown in phantom in this embodiment) may be included and closed during a regenerative braking event together with switch 136 to operate auxiliary load(s) 140 from the regenerative braking energy.

A technical contribution for the disclosed apparatus is that it provides for a controller implemented technique for transferring energy between an electrical storage device or electrical energy source of the vehicle or drive to a load.

Therefore, according to an embodiment of the invention, an apparatus includes a first energy source configured to output a DC voltage, a DC link coupled to a DC load and configured to supply a DC load voltage to the DC load based on the DC voltage from the first energy source, a first DC-to-DC voltage converter coupled to the DC link and configured to supply the DC load voltage to the DC link, and a second DC-to-DC voltage converter coupled to the first energy source. The apparatus also includes a controller coupled to the first and second DC-to-DC voltage converters and configured to determine a voltage level of the first energy source, to determine a voltage level of the DC link, and, if the voltage level of the DC link is less than the voltage level of the first energy source, to control the second DC-to-DC voltage converter to draw energy from the first energy source to cause the DC voltage output from the first energy source and supplied to the first DC-to-DC voltage converter to be below the DC load voltage supplied to the DC link via the first DC-to-DC voltage converter.

According to another embodiment of the invention, a method of fabricating an energy transfer system including coupling a DC link to a DC load wherein the DC link configured to supply a DC load voltage to the DC load, coupling a first DC-to-DC voltage converter to the DC link wherein the first DC-to-DC voltage converter configured to supply the DC load voltage to the DC link, and coupling a second DC-to-DC voltage converter to a first energy source wherein the first energy source configured to output a DC voltage. The method also includes coupling a controller to the first and second DC-to-DC voltage converters and configuring the controller to compare a voltage level of the first energy source with a voltage level of the DC link, and if the voltage level of the first energy source is greater than the voltage level of the DC link, control the second DC-to-DC voltage converter to draw energy from the first energy source to cause the DC voltage output from the first energy source and supplied to the first DC-to-DC voltage converter to be below the voltage level of the DC link.

According to yet another embodiment of the invention, a system includes a DC link, a load coupled to the DC link and configured to receive a load voltage therefrom, and a first energy source. The system also includes a first voltage measuring device coupled to the first energy source, a second voltage measuring device coupled to the DC link, a bi-directional energy source voltage converter configured to convert a first input voltage to a first converted voltage wherein the first input voltage supplied from the first energy source, and a bi-directional DC link voltage converter configured to convert a second input voltage to a second converted voltage and supply the second converted voltage to the DC link wherein the second converted voltage comprising the load voltage. The system also includes a controller configured to receive a voltage level of the first energy source from the first voltage measuring device, to receive a voltage level of the DC link from the second voltage measuring device, and to compare the voltage level of the first energy source with the voltage level of the DC link. The controller is also configured to control the bi-directional energy source voltage converter to draw energy from the first energy source to cause the second input voltage to be below the load voltage if the voltage level of the DC link is less than the voltage level of the first energy source, and control the bi-directional DC link voltage converter to convert the second input voltage to the second converted voltage and to supply the second converted voltage to the DC link.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An apparatus comprising:
a first energy source configured to output a DC voltage;
a DC link coupled to a DC load and configured to supply a DC load voltage to the DC load based on the DC voltage from the first energy source;
a first DC-to-DC voltage converter coupled to the DC link and configured to supply the DC load voltage to the DC link;
a second DC-to-DC voltage converter coupled to the first energy source; and
a controller coupled to the first and second DC-to-DC voltage converters and configured to:
determine a voltage level of the first energy source;
determine a voltage level of the DC link; and
if the voltage level of the DC link is less than the voltage level of the first energy source, control the second DC-to-DC voltage converter to draw energy from the first energy source to cause the DC voltage output from the first energy source and supplied to the first DC-to-DC voltage converter to be below the DC load voltage supplied to the DC link via the first DC-to-DC voltage converter.

2. The apparatus of claim 1 wherein the controller, in being configured to control the second DC-to-DC voltage converter to draw energy from the first energy source, is configured to buck a voltage from the first energy source to a lower, bucked voltage; and
wherein the controller is further configured to control the first DC-to-DC voltage converter to boost the bucked voltage to the DC load voltage.

3. The apparatus of claim 1 further comprising an auxiliary load selectively coupleable to the second DC-to-DC voltage converter via a switch; and
wherein the controller is further configured to cause the energy drawn from the first energy source to be supplied to the auxiliary load via the switch.

4. The apparatus of claim 1 further comprising an auxiliary load selectively coupleable to the first energy source via at least one switch; and
wherein the controller is further configured to cause voltage output from the first energy source to be supplied to the auxiliary load via the at least one switch if the voltage level of the DC link is greater than the voltage level of the first energy source.

5. The apparatus of claim 1 further comprising an auxiliary load selectively coupleable to the first energy source via at least one switch; and
wherein the controller is further configured to cause voltage output from the first energy source to be boosted and supplied to the auxiliary load via the at least one switch.

6. The apparatus of claim 1 further comprising a second energy source configured to output a DC voltage and coupled to the DC link.

7. The apparatus of claim 6 wherein second energy source is configured to control the voltage level of the DC link.

8. The apparatus of claim 6 further comprising:
a third energy source;
a third DC-to-DC voltage converter coupled to the third energy source and to the DC link; and
wherein the controller is further configured to:
boost a voltage from third energy source to a voltage level greater than the voltage level of the first energy source if the voltage level of the DC link is greater than the voltage level of the first energy source; and
supply the boosted voltage to the DC link.

9. The apparatus of claim 1 further comprising a dynamic grid resistor array coupled to the second DC-to-DC converter; and
wherein the controller is further configured to cause voltage output from the first energy source to be supplied to the dynamic grid resistor array if the voltage level of the first energy source is greater than the voltage level of the DC link.

10. The apparatus of claim 9 wherein the controller is further configured to cause voltage generated during a regenerative braking event and supplied to the DC link to be supplied to the dynamic grid resistor array.

11. The apparatus of claim 1 wherein the DC load comprises a DC-to-AC inverter coupled to an electromechanical device.

12. A method of fabricating an energy transfer system comprising:
coupling a DC link to a DC load, the DC link configured to supply a DC load voltage to the DC load;

coupling a first DC-to-DC voltage converter to the DC link, the first DC-to-DC voltage converter configured to supply the DC load voltage to the DC link;
coupling a second DC-to-DC voltage converter to a first energy source, the first energy source configured to output a DC voltage;
coupling a controller to the first and second DC-to-DC voltage converters and configuring the controller to:
compare a voltage level of the first energy source with a voltage level of the DC link; and
if the voltage level of the first energy source is greater than the voltage level of the DC link, control the second DC-to-DC voltage converter to draw energy from the first energy source to cause the DC voltage output from the first energy source and supplied to the first DC-to-DC voltage converter to be below the voltage level of the DC link.

13. The method of claim 12 further comprising configuring the controller to:
cause the second DC-to-DC voltage converter to buck the DC voltage output from the first energy source to a lower voltage; and
cause the first DC-to-DC voltage converter to boost the lower voltage to a level substantially equal to the voltage level of the DC link.

14. The method of claim 12 further comprising:
coupling an auxiliary load to the second DC-to-DC voltage converter; and
configuring the controller to supply the energy drawn from the first energy source to the auxiliary load.

15. The method of claim 12 further comprising coupling a second energy source to the DC link, the second energy source configured to output a DC voltage.

16. The method of claim 15 further comprising:
coupling a third DC-to-DC voltage converter to the DC link;
coupling a third energy source to the third DC-to-DC voltage converter; and
configuring the controller to cause the third DC-to-DC voltage converter to:
boost a voltage from third energy source to a voltage level greater than the voltage level of the first energy source if the voltage level of the DC link is greater than the voltage level of the first energy source; and
supply the boosted voltage to the DC link.

17. The method of claim 12 further comprising:
coupling a dynamic grid resistor array to the second DC-to-DC converter; and
configuring the controller to cause voltage output from the first energy source to be supplied to the dynamic grid resistor array if the voltage level of the first energy source is greater than the voltage level of the DC link.

18. A system comprising:
a DC link;
a load coupled to the DC link and configured to receive a load voltage therefrom;
a first energy source;
a first voltage measuring device coupled to the first energy source;
a second voltage measuring device coupled to the DC link;
a bi-directional energy source voltage converter configured to convert a first input voltage to a first converted voltage, the first input voltage supplied from the first energy source;
a bi-directional DC link voltage converter configured to convert a second input voltage to a second converted voltage and supply the second converted voltage to the DC link, the second converted voltage comprising the load voltage; and
a controller configured to:
receive a voltage level of the first energy source from the first voltage measuring device;
receive a voltage level of the DC link from the second voltage measuring device;
compare the voltage level of the first energy source with the voltage level of the DC link;
control the bi-directional energy source voltage converter to draw energy from the first energy source to cause the second input voltage to be below the load voltage if the voltage level of the DC link is less than the voltage level of the first energy source; and
control the bi-directional DC link voltage converter to convert the second input voltage to the second converted voltage and to supply the second converted voltage to the DC link.

19. The system of claim 18 wherein the controller, in being configured to control the bi-directional DC link voltage converter to convert the second input voltage to the second converted voltage, is configured to control the bi-directional DC link voltage converter to convert the first converted voltage to the load voltage.

20. The system of claim 18 wherein controller is further configured to control the bi-directional energy source voltage converter to convert the first input voltage from the first energy source to the load voltage if the voltage level of the first energy source is greater than the voltage level of the DC link.

21. The system of claim 18 wherein controller is further configured to control the bi-directional energy source voltage converter and the bi-directional DC link voltage converter according to an interleaved chopping scheme if the voltage level of the DC link is greater than the voltage level of the first energy source.

* * * * *